（12) United States Patent
Matsumura et al.

(10) Patent No.: US 11,665,767 B2
(45) Date of Patent: May 30, 2023

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Min Liu, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 106 days.

(21) Appl. No.: 17/048,241

(22) PCT Filed: Apr. 15, 2019

(86) PCT No.: PCT/JP2019/016143
§ 371 (c)(1),
(2) Date: Oct. 16, 2020

(87) PCT Pub. No.: WO2019/203187
PCT Pub. Date: Oct. 24, 2019

(65) Prior Publication Data
US 2021/0076442 A1 Mar. 11, 2021

(30) Foreign Application Priority Data
Apr. 18, 2018 (JP) .............................. JP2018-090962

(51) Int. Cl.
*H04W 76/19* (2018.01)
*H04L 5/00* (2006.01)
*H04W 74/08* (2009.01)

(52) U.S. Cl.
CPC ........... *H04W 76/19* (2018.02); *H04L 5/0048* (2013.01); *H04W 74/0833* (2013.01)

(58) Field of Classification Search
CPC ............. H04W 76/19; H04W 74/0833; H04W 56/001; H04W 74/002; H04W 24/08; H04L 5/0048; H04L 5/0057
See application file for complete search history.

(56) References Cited

U.S. PATENT DOCUMENTS

| 2011/0176513 A1* | 7/2011 | Yi | ....................... H04W 74/002 370/328 |
| 2017/0195998 A1* | 7/2017 | Zhang | .................... H04L 5/0057 |

(Continued)

FOREIGN PATENT DOCUMENTS

| CN | 110149179 A | * | 8/2019 | ........... H04L 5/0053 |
| EP | 3528399 A1 | * | 8/2019 | ............. H04B 7/088 |

OTHER PUBLICATIONS

3GPP TSG-RAN WG1 #92b; R1-1804788 "Beam failure recovery procedure" Qualcomm; Sanya, China; Apr. 16-20, 2018 (10 pages) (Year: 2018).*

(Continued)

*Primary Examiner* — Ayaz R Sheikh
*Assistant Examiner* — Louis Samara
(74) *Attorney, Agent, or Firm* — Osha Bergman Watanabe & Burton LLP

(57) ABSTRACT

A terminal is disclosed including a processor that starts a timer based on a beam failure instance counter; a receiver that receives a reference signal for identifying a candidate beam; and a transmitter that, if the reference signal has layer 1 reference signal received power (L1-RSRP) exceeding a threshold value before the timer expires, and if there is at least one of contention-free random access (CFRA) resources corresponding to the reference signal, transmits a random access preamble using the at least one of CFRA resources. In other aspects, a radio communication method and a base station are also disclosed.

5 Claims, 17 Drawing Sheets

(56) References Cited

U.S. PATENT DOCUMENTS

| | | | | |
|---|---|---|---|---|
| 2017/0231011 | A1* | 8/2017 | Park | H04W 72/0446 |
| 2019/0215119 | A1* | 7/2019 | Kim | H04L 5/0048 |
| 2020/0328796 | A1* | 10/2020 | Turtinen | H04W 24/08 |
| 2021/0021320 | A1* | 1/2021 | Koskela | H04W 56/001 |

OTHER PUBLICATIONS

3GPP TSG RAN WG1 Meeting #92bis; R1-1804975 "Remaining issues on beam recovery" Ericsson; Sanya, China; Apr. 16-20, 2018 (9 pages) (Year: 2018).*

International Search Report issued in PCT/JP2019/016143 dated Jun. 25, 2019 (2 pages).

Written Opinion of the International Searching Authority issued in PCT/JP2019/016143 dated Jun. 25, 2019 (4 pages).

MediaTek Inc.; "Clarifications on Beam Failure Recovery Procedure"; 3GPP TSG-RAN2#101, R2-1802406; Athens, Greece; Feb. 26-Mar. 2, 2018 (13 pages).

CATT; "BFR on SCell"; 3GPP TSG-RAN WG2#101bis, R2-1804483; Sanya, China; Apr. 16-20, 2018 (6 pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG-RAN WG1 #92b; R1-1804788 "Beam failure recovery procedure" Qualcomm; Sanya, China; Apr. 16-20, 2018 (10 pages).

3GPP TS 38.321 V15.1.0 "3rd Generation Partnership Project; Technical Specification Group Radio Access Network MR; Medium Access Control (MAC) protocol specification (Release 15)" Mar. 2018 (67 pages).

3GPP TSG RAN WG1 Meeting #92bis; R1-1804975 "Remaining issues on beam recovery" Ericsson; Sanya, China Apr. 16-20, 2018 (9 pages).

Extended European Search Report issued in European Application No. 19789469.4, dated Dec. 3, 2021 (9 pages).

Office Action issued in Taiwanese Application No. 108113329 dated Apr. 8, 2022 (9 pages).

Office Action issued in Indian Application No. 202037046171 dated Aug. 4, 2022 (6 pages).

Decision of Rejection issued in Taiwanese Application No. 108113329 dated Sep. 14, 2022 (10 pages).

* cited by examiner

TERMINAL, RADIO COMMUNICATION METHOD, AND BASE STATION

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In the existing LTE systems (LTE Rel. 8 to Rel. 13), monitoring of radio link quality (radio link monitoring (RLM)) is performed. When a radio link failure (RLF) is detected in RLM, a user terminal (UE (User Equipment)) is requested to perform RRC (Radio Resource Control) connection re-establishment.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, performance of a procedure of detecting a beam failure and switching to another beam (which may be referred to as a beam recovery (BR) procedure and so on) is under study. In the BR procedure, the UE transmits a beam recovery request (BFRQ (Beam Failure Recovery request)).

However, study as to what type of resource is to be specifically used is not developed yet. Communication throughput, spectral efficiency, and so on may be deteriorated, unless appropriate resources are specified.

In view of this, the present disclosure has one object to provide a user terminal and a radio communication method that can appropriately perform a beam recovery procedure.

Solution to Problem

A user terminal according to one aspect of the present disclosure includes: a control section that starts a certain timer, based on a beam failure instance counter; and a transmitting section that transmits a random access preamble by using Contention-Free Random Access (CFRA) resources, in a case that the certain timer has not yet expired, and that there is a reference signal for candidate beam identification having Layer 1 Reference Signal Received Power (L1-RSRP) exceeding a certain threshold, and that there are the CFRA resources corresponding to the reference signal.

Advantageous Effects of Invention

According to one aspect of the present disclosure, a beam recovery procedure can be appropriately performed.

DESCRIPTION OF EMBODIMENTS

For NR, performing communication by using beamforming (BF (Beam Forming)) is under study. For example, a UE and/or a base station (for example, a gNB (gNodeB)) may use a beam used to transmit a signal (also referred to as a transmit beam, a Tx beam, and so on), and a beam used to receive a signal (also referred to as a receive beam, an Rx beam, and so on).

In the environment using BF, it is assumed that radio link quality is deteriorated because the radio link quality is liable to suffer the influence of interruption of an obstruction. Due to deterioration of the radio link quality, a radio link failure (RLF) may frequently occur. When RLF occurs, reconnection to a cell is required. Therefore, frequent occurrence of RLF causes deterioration of system throughput.

For NR, to reduce occurrence of RLF, the following is under study: when quality of a specific beam is deteriorated, a procedure of switching to another beam (which may be referred to as beam recovery (BR), beam failure recovery (BFR), L1/L2 (Layer 1/Layer 2) beam recovery, and so on) is performed. Note that the BFR procedure may be simply referred to as BFR.

Figure 1:
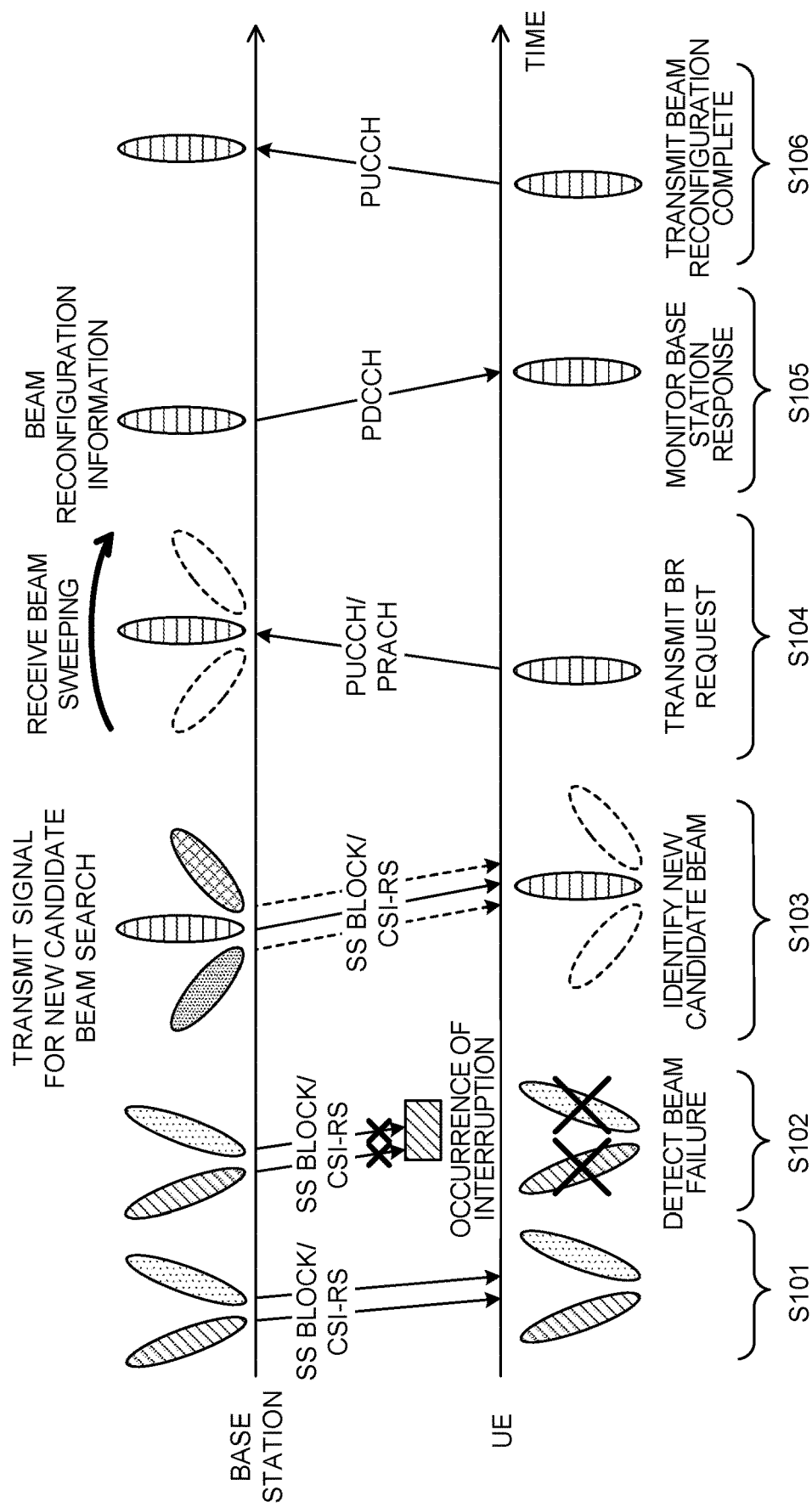
FIG. 1 is a diagram to show an example of a beam recovery procedure.

FIG. 1 is a diagram to show an example of a beam recovery procedure. The number of beams and so on are merely examples, and are not restrictive. In an initial state (Step S101) of FIG. 1, the UE performs measurement based on reference signal (RS) resources transmitted by using two beams.

The RS may be at least one of a synchronization signal block (SSB) and a channel state measurement RS (CSI-RS (Channel State Information RS)). Note that the SSB may be referred to as an SS/PBCH (Physical Broadcast Channel) block and so on.

The RS may be at least one of a primary synchronization signal (PSS (Primary SS)), a secondary synchronization signal (SSS (Secondary SS)), a mobility reference signal (MRS (Mobility RS)), a signal included in an SSB, a CSI-RS, a demodulation reference signal (DMRS), a beam-specific signal, and so on, or may be a signal configured by extending and/or modifying the above signals (for example, a signal configured by modifying density and/or a period). The RS measured in Step S101 may be referred to as an RS for beam failure detection.

May be, or the order may be rearranged. Whether or not BFR is performed may be configured for the UE by using higher layer signaling.

In Step S102, due to interruption of radio waves from the base station, the UE fails to detect the RS for beam failure detection (or received quality of the RS is deteriorated). Such interruption may occur due to the influence of an obstruction between the UE and the base station, fading, interference, and so on, for example.

When certain conditions are satisfied, the UE detects a beam failure. For example, when all the configured RSs for beam failure detection have a BLER (Block Error Rate) equal to or less than a threshold, the UE may detect the occurrence of the beam failure. Note that criteria for the determination are not limited to the BLER. Instead of the RS measurement or in addition to the RS measurement, the beam failure detection may be performed based on a PDCCH and so on.

Information related to the RS for beam failure detection (for example, RS resources, the number thereof, the number of ports, precoding, and so on) and information related to beam failure detection (for example, the above threshold) may be configured for (notified to) the UE, by using higher layer signaling and so on.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), other system information (OSI), and the like.

When there is no notification from the UE, or when the base station receives a certain signal (beam recovery request in Step S104) from the UE, the base station may determine that the UE has detected the beam failure.

In Step S103, for the sake of beam recovery, the UE initiates search for a new candidate beam to be used for new communication. The UE may measure a certain RS, and may thereby select a new candidate beam corresponding to the RS. The RS measured in Step S103 may be referred to as an RS for new candidate beam identification. The RS for new candidate beam identification may be the same as or different from the RS for beam failure detection.

The UE may determine that a beam corresponding to an RS satisfying certain conditions is the new candidate beam. For example, the UE may determine the new candidate beam, based on an RS having L1-RSRP (reference signal received power (RSRP) in a physical layer) exceeding a threshold among the configured RSs for new candidate beam identification. Note that criteria for the determination are not limited to the L1-RSRP.

Information related to the RS for new candidate beam identification (for example, RS resources, the number thereof, the number of ports, precoding, and so on), information related to new candidate beam identification (for example, the above threshold), and so on may be configured for (notified to) the UE, by using higher layer signaling and so on. The information related to the RS for new candidate beam identification may be acquired based on the information related to the RS for beam failure detection.

In Step S104, the UE that has identified the new candidate beam transmits a beam recovery request (BFRQ (Beam Failure Recovery reQuest)). The beam recovery request may be referred to as a beam recovery request signal, a beam failure recovery request signal, and so on.

For example, the BFRQ may be transmitted by using at least one of an uplink control channel (PUCCH (Physical Uplink Control Channel)), a random access channel (PRACH (Physical Random Access Channel)), and a UL grant free PUSCH (Physical Uplink Shared Channel).

The BFRQ may include information of the new candidate beam identified in Step S103. Resources for the BFRQ may be associated with the new candidate beam. Information of the beam may be notified by using a beam index (BI), a port for a certain reference signal, a resource index (for example, a CSI-RS resource indicator (CRI)), and/or the like.

In Step S105, the base station that has detected the BFRQ transmits a response signal (which may be referred to as a gNB response and so on) for the BFRQ from the UE. The response signal may include reconfiguration information (for example, configuration information of DL-RS resources) related to one or a plurality of beams. For example, the response signal may be transmitted in a UE-common search space for a PDCCH. The response signal may be notified by using a PDCCH (DCI) CRC-scrambled with a C-RNTI. The UE may determine a transmit beam and/or a receive beam to be used, based on the beam reconfiguration information.

Regarding the processing of Step S105, a period for the UE to monitor the response from the base station (for example, a gNB) for the BFRQ may be configured. For example, the period may be referred to as a gNB response window, a gNB window, a beam recovery request response window, and so on.

When there is no gNB response detected within the window period, the UE may retransmit a BFRQ.

In Step S106, the UE may transmit a message to the base station, indicating that beam reconfiguration has been completed. For example, the message may be transmitted on a PUCCH, or may be transmitted on a PUSCH.

Beam recovery success (BR success) may represent a case where the processing has reached Step S106, for example. On the other hand, beam recovery failure (BR failure) may be equivalent to a case where BFRQ transmission has reached a certain number of times, or a case where a beam failure recovery timer (Beam-failure-recovery-Timer) has expired, for example.

Note that the numbers of the above steps are merely numbers assigned for the sake of description. A plurality of steps may be combined together, or the order may be rearranged. Whether or not BFR is performed may be configured for the UE by using higher layer signaling.

For NR, CB-BFR (Contention-Based BFR), which is BFR based on a contention-based random access (RA) procedure, and CF-BFR (Contention-Free BFR), which is BFR based on a contention-free random access procedure, are under study. In CB-BFR and CF-BFR, the UE may transmit a preamble (also referred to as an RA preamble, a random access channel (PRACH (Physical Random Access Channel)), a RACH preamble, and so on) as the BFRQ, by using PRACH resources.

In CB-BFR, the UE may transmit a preamble selected from one or a plurality of preambles at random. On the other hand, in CF-BFR, the UE may transmit a preamble that is allocated for the UE in a UE-specific manner by the base station. In CB-BFR, the base station may allocate the same preamble for a plurality of UEs. In CF-BFR, the base station may allocate a preamble individually for a UE.

Note that CB-BFR and CF-BFR may be referred to as CB PRACH-based BFR (CBRA-BFR (contention-based PRACH-based BFR)) and CF PRACH-based BFR (CFRA-BFR (contention-free PRACH-based BFR)), respectively. CBRA-BFR may be referred to as CBRA for BFR. CFRA-BFR may be referred to as CFRA for BFR.

In CB-BFR, when the base station receives a certain preamble as the BFRQ, the base station may not be able to identify to which UE the preamble is transmitted. When contention resolution is performed at some point between the BFRQ and the beam reconfiguration completion, the base station can identify an identifier (for example, a cell-radio RNTI (C-RNTI)) of the UE to which the preamble is transmitted.

It may be assumed that the signal (for example, a preamble) transmitted by the UE during the RA procedure is the BFRQ.

In either case of CB-BFR or CF-BFR, information related to PRACH resources (RA preamble) may be notified by using higher layer signaling (RRC signaling and so on), for example. For example, the information may include information indicating correspondence between a detected DL-RS (beam) and PRACH resources, and different PRACH resources may be associated for each DL-RS.

Detection of a beam failure may be performed in a MAC layer. Regarding CB-BFR, when the UE receives a PDCCH corresponding to a C-RNTI related to the UE itself, it may be determined that contention resolution has succeeded.

RA parameters of CB-BFR and CF-BFR may be of the same parameter set. Different values may be configured for the RA parameters of CB-BFR and CF-BFR.

For example, a parameter (which may be referred to as "ResponseWindowSize-BFR") indicating a time length for monitoring of a gNB response within a CORESET for a beam failure recovery response after a BFRQ may be applied to only any one of CF-BFR and CB-BFR.

Incidentally, as described above, resources for a BFRQ may be associated with a new candidate beam. However, study as to what type of resource is to be specifically used is not developed yet. Communication throughput, spectral efficiency, and so on may be deteriorated, unless appropriate resources are specified.

In view of this, the inventors of the present invention come up with the idea of a method of determining preferable resources for a BFRQ, and its associated operation.

Embodiments according to the present disclosure will be described in detail with reference to the drawings as follows. A radio communication method according to each embodiment may be employed independently or may be employed in combination.

(Radio Communication Method)

In one embodiment, resources for BFRQ transmission may include contention-free resources. The contention-free resource may be referred to as a UE-specific resource (dedicated resource), a pre-configured resource, and so on.

The contention-free resource may include a contention-free PRACH resource. The contention-free resource may include a PUCCH resource. The PUCCH resource has granularity smaller than that of the PRACH resource, and thus reduction in UL overheads can be expected.

The contention-free resource may include a UL grant free PUSCH resource. Note that grant free may be referred to as a configured grant. When a grant free PUSCH resource is used, more pieces of information can be included in a BFRQ, and also prompt transmission is possible.

The resources for BFRQ transmission may include contention-based resources. The contention-based resource may include a contention-based PRACH resource.

As a BFRQ transmission procedure, any of the following may be used:

(1) In BFRQ transmission, only contention-free resources are used (supported);

(2) In BFRQ transmission, only contention-based resources are used (supported); and (3) In BFRQ transmission, both contention-based resources and contention-free resources are used (supported).

In the case of (1) above, when a UE detects a new candidate beam associated with PRACH resources configured for the UE itself, the UE may transmit a BFRQ.

In the case of (2) above, when a UE detects a new candidate beam associated with PRACH resources configured for all the UEs, the UE may transmit a BFRQ.

In the case of (3) above, when a UE detects a new candidate beam, the UE may transmit a BFRQ.

Note that, in any of the cases (1) to (3) above, the UE may assume that the UE can transmit a BFRQ, on the condition that a beam recovery timer has not expired yet, and that the number of times of BFRQ transmission is equal to or less than a certain threshold (maximum number of times that is configured or specified).

Figure 2:
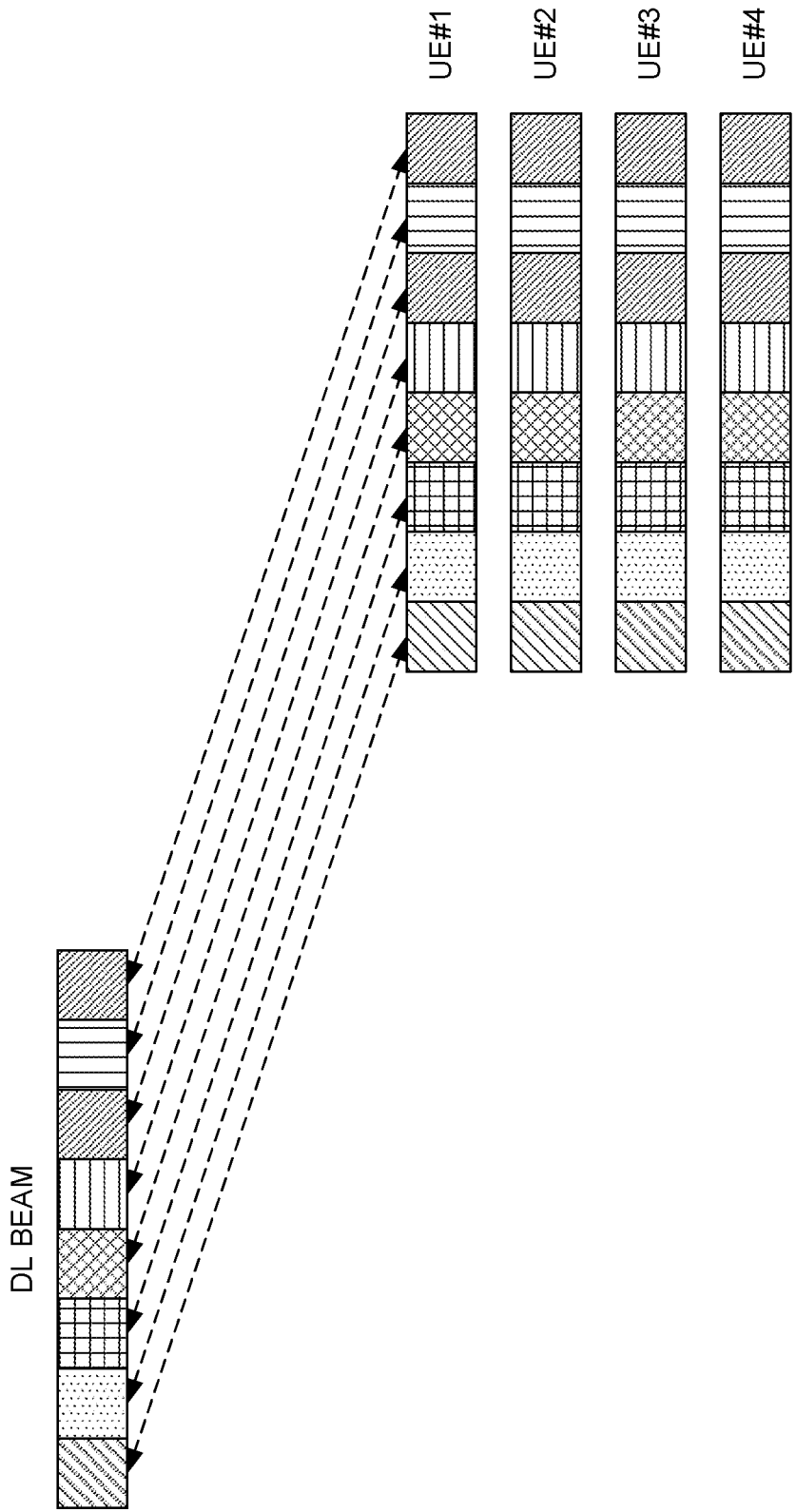
FIG. 2 is a diagram to show an example of contention-free resources according to one embodiment.

FIG. 2 is a diagram to show an example of contention-free resources according to one embodiment. Different contention-free resources may be allocated for each UE and each beam. In FIG. 2, eight DL beams are shown, and eight PRACH resources corresponding to the respective DL beams are shown. Regarding each of UEs 1 to 4, different PRACH resources are shown for the same beam. Based on detected PRACH resources, the gNB can know which UE failed to detect a DL beam, and which beam was determined as a new candidate beam of which UE.

Figure 3:
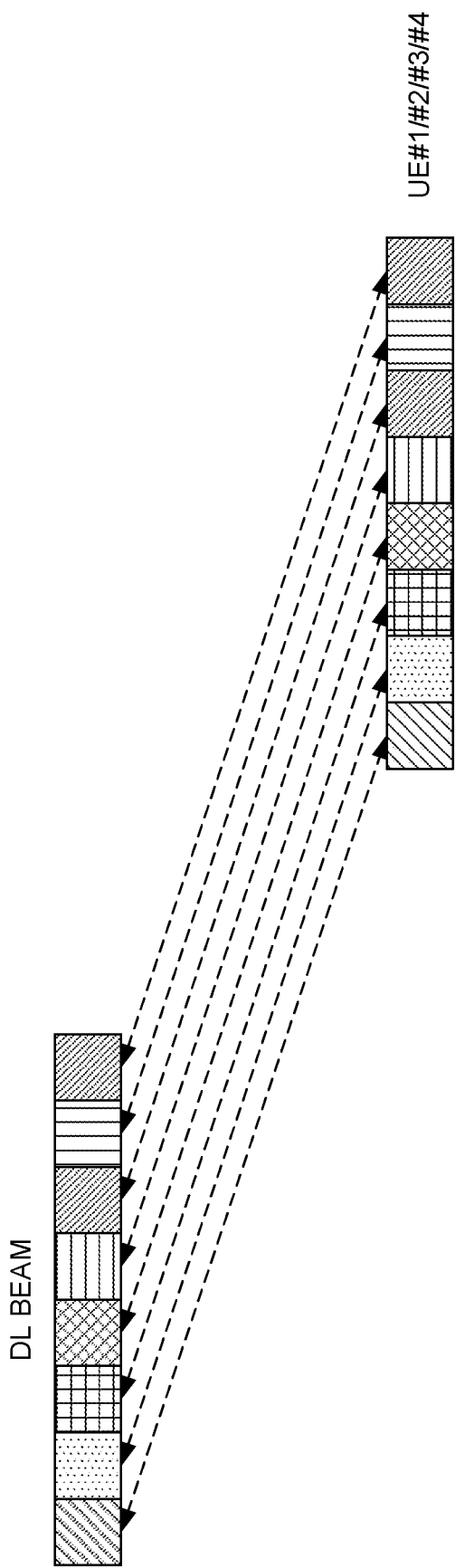
FIG. 3 is a diagram to show an example of contention-based resources according to one embodiment.

FIG. 3 is a diagram to show an example of contention-based resources according to one embodiment. Common contention-based resources may be shared by UEs, while different contention-based resources may be allocated for each beam. In FIG. 3, eight DL beams are shown, and eight PRACH resources corresponding to the respective DL beams are shown. Any of UEs 1 to 4 uses the same PRACH resources for the same beam. Based on detected PRACH resources, the gNB can know which beam was determined as a new candidate beam of a certain UE. The gNB can know which UE failed to detect a DL beam, based on contention resolution.

The contention-based resources may be associated with at least one of a beam of an RS for new candidate beam identification, a resource, a port, a sequence, and an index (for example, an RS index, a beam index, a resource index, a port index, a sequence index, and so on). The UE may determine resources to be used to transmit a BFRQ, based on correspondence between at least one of a beam, a resource, a port, a sequence, and so on of an RS for new candidate beam identification and contention-based resources.

The contention-free resources may be associated with at least one of a beam, a resource, a port, a sequence, an index (for example, an RS index, a beam index, a resource index, a port index, a sequence index, and so on), and so on of an RS for new candidate beam identification. The UE may determine resources to be used to transmit a BFRQ, based on correspondence between at least one of a beam, a resource, a port, a sequence, and so on of an RS for new candidate beam identification and contention-free resources.

Note that contention-based resources corresponding to all the RSs for new candidate beam identification may not be configured. Contention-free resources corresponding to all the RSs for new candidate beam identification may not be configured.

Information related to the at least one correspondence described above may be configured for the UE by using higher layer signaling and so on, or may be determined by a specification.

Specific notification of BFRQ transmission and BFR failure will be described below. Note that, in the present disclosure, a contention-free resource and a CFRA resource may be interpreted interchangeably. A contention-based resource and a CBRA resource may be interpreted interchangeably.

<Only Contention-Free Resources are Supported in BFRQ Transmission>,

When the UE supports BFRQ transmission of only contention-free resources, typically, the following four cases are conceivable:

(1-1) Within a timer, there is no new candidate beam identified as criteria by using L1-RSRP;

(1-2) Within a timer, there is a new candidate beam identified as criteria by using L1-RSRP, but there are no contention-free resources corresponding to the new candidate beam;

(1-3) Within a timer, there is a new candidate beam identified as criteria by using L1-RSRP, and there are contention-free resources corresponding to the new candidate beam, but there is no response from the gNB for a BFRQ before the timer expires or before the number of times of BFRQ transmission reaches its upper limit; and (1-4) Within a timer, there is a new candidate beam identified as criteria by using L1-RSRP, there are contention-free resources corresponding to the new candidate beam, and there is a response from the gNB for a BFRQ before the timer expires or before the number of times of BFRQ transmission reaches its upper limit.

Figure 4:
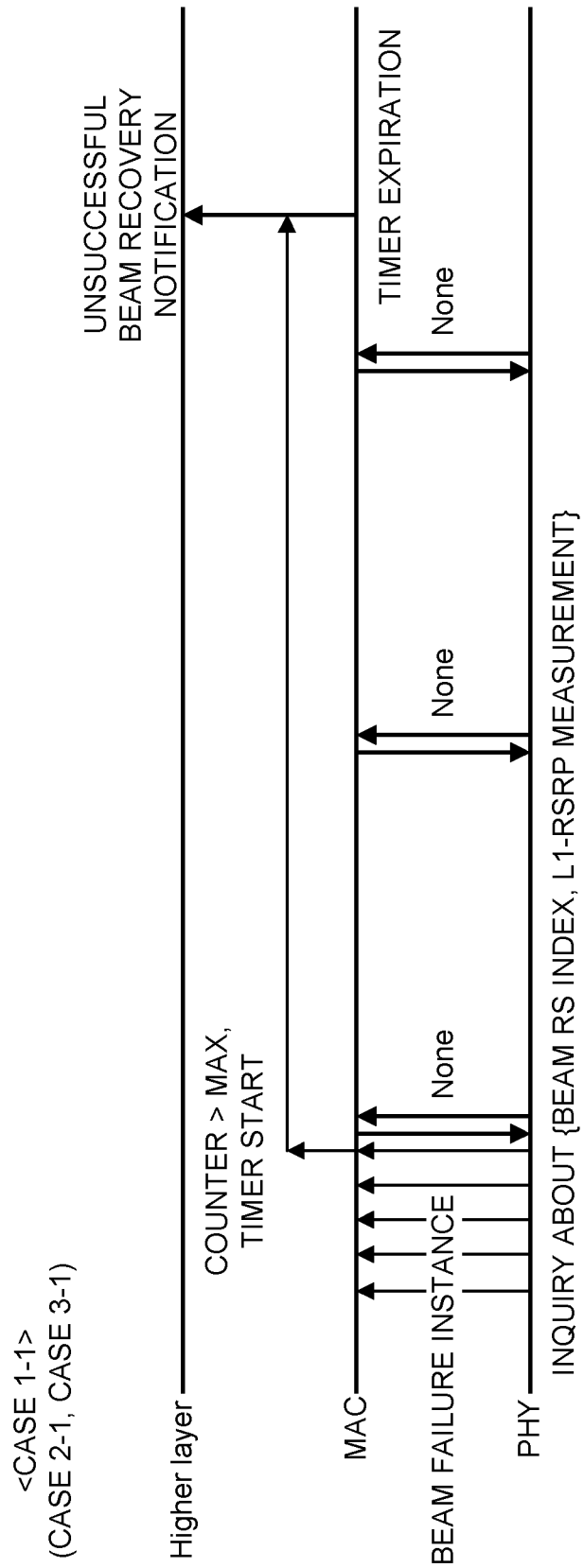
FIG. 4 is a diagram to show an example of Case (1-1)
Figure 5:
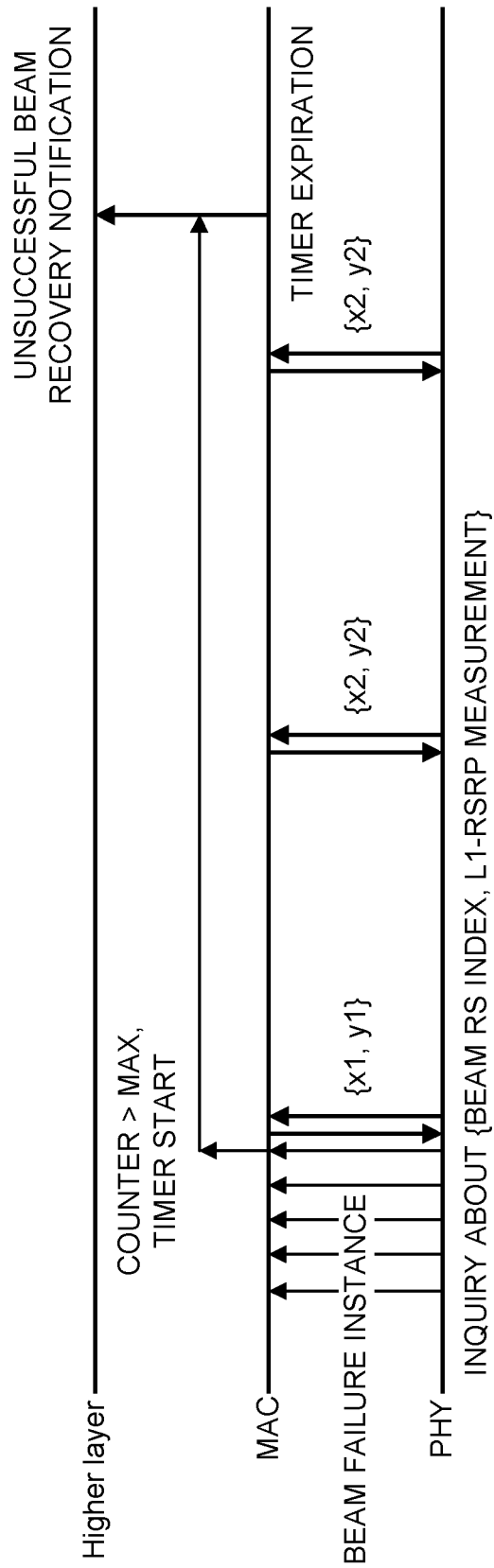
FIG. 5 is a diagram to show an example of Case (1-2)
Figure 6:
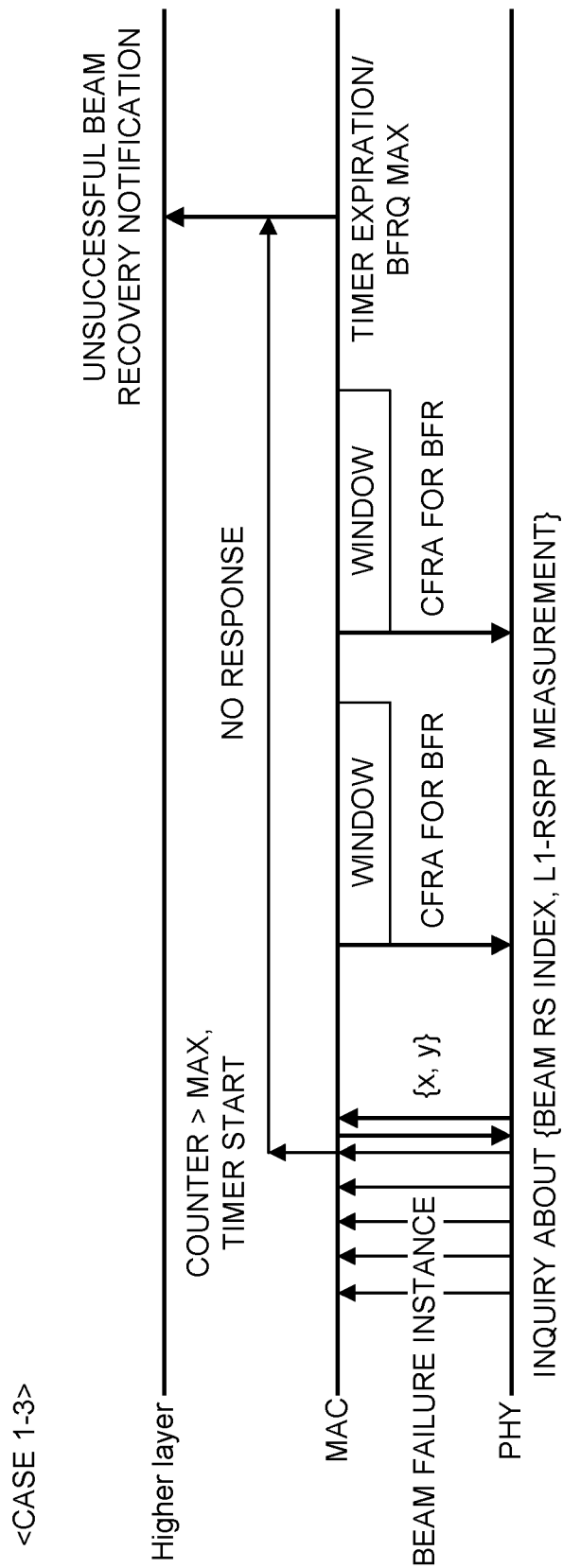
FIG. 6 is a diagram to show an example of Case (1-3)
Figure 7:
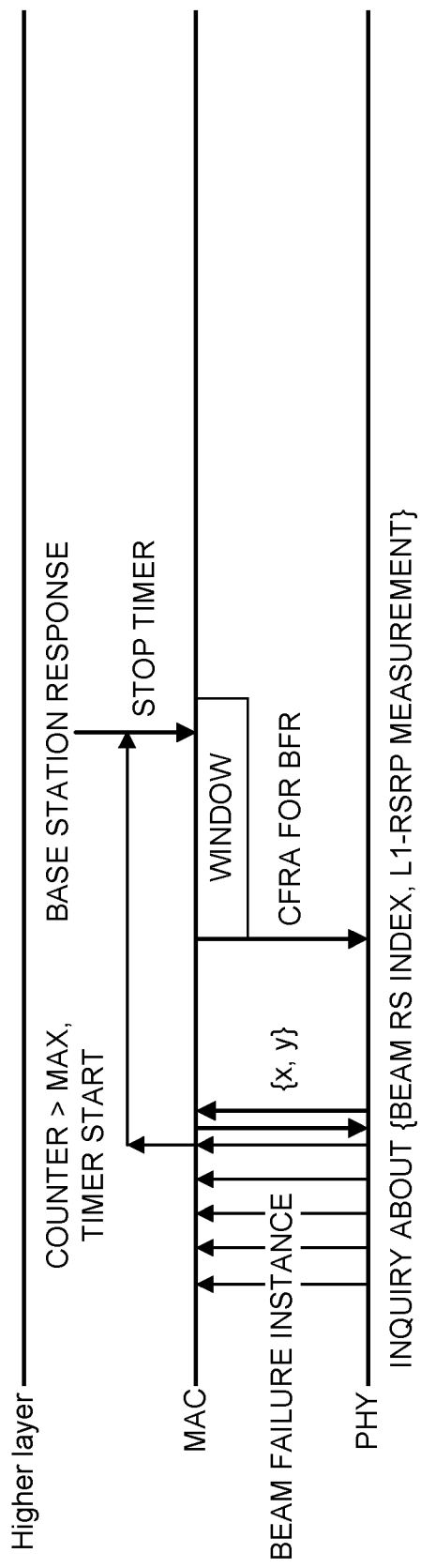
FIG. 7 is a diagram to show an example of Case (1-4)

FIG. 4 is a diagram to show an example of Case (1-1). FIG. 5 is a diagram to show an example of Case (1-2). FIG. 6 is a diagram to show an example of Case (1-3). FIG. 7 is a diagram to show an example of Case (1-4). Note that FIG. 4 also serves as a diagram for Case (2-1) and Case (3-1) to be described later.

In any of FIGS. 4 to 7, when the UE detects a beam failure, the UE reports a notification about the beam failure from the PHY layer to the MAC layer.

The occurrence of a beam failure may be referred to as a beam failure instance and so on. The notification about a beam failure may be referred to as a beam failure instance notification (beam failure instance indicator), information related to a beam failure, information as to whether there is a beam failure, and so on. The beam failure instance may correspond to a given number of (for example, zero, one, a plurality of, and so on) beam failure(s), or may correspond to beam failure(s) detected within a certain period.

The MAC layer may count the number of beam failure instances, based on beam failure instance notifications. The beam failure instances may be counted by using a beam failure instance counter. The counter may be used for the MAC layer. The counter may start from a certain value (for example, 0).

In any of FIGS. 4 to 7, when the beam failure instance counter reaches or exceeds a certain threshold, the MAC layer starts a certain timer (for example, a beam failure recovery timer). The MAC layer makes an inquiry about a new candidate beam to the PHY layer. For example, the MAC layer may make an inquiry to the PHY layer about at least one of an index of the detected new candidate beam and information of measurement corresponding to the beam (for example, measurement results).

For example, the MAC layer may attempt to perform processing of making an inquiry to the PHY layer about an index of a DL-RS (or a beam index) having L1-RSRP measurement results of a certain threshold or more (for example, results of the most preferable value) and information of the measurement results, and then receiving these pieces of information from the PHY layer.

In FIG. 4, the timer expires, with the MAC layer receiving no response from the PHY layer for the inquiry about a new candidate beam. When the timer expires, the MAC layer may notify a higher layer (for example, an RRC layer) of unsuccessful BR (unsuccessful beam recovery).

In FIG. 5, in response to the inquiry about a new candidate beam, the PHY layer notifies the MAC layer that the PHY layer has a new candidate beam of {beam RS index, L1-RSRP measurement}={x1, y1}. However, the MAC layer does not have CFRA resources corresponding to the new candidate beam, and hence does not trigger a BFRQ.

The MAC layer makes an inquiry about a new candidate beam to the PHY layer one more time. Then, in response to such a second inquiry, the PHY layer notifies the MAC layer that the PHY layer has a new candidate beam of {beam RS index, L1-RSRP measurement}={x2, y2}. However, the MAC layer does not have CFRA resources corresponding to the new candidate beam, and hence does not trigger a BFRQ.

Note that, in response to the inquiry about a new candidate beam, the PHY layer may give notification of information of a plurality of new candidate beams. For example, the PHY layer may notify the MAC layer of {beam RS index, L1-RSRP measurement}={x1, y1} and {beam RS index, L1-RSRP measurement}={x2, y2}, within one report.

The MAC layer that has received the information of a plurality of new candidate beams may perform control of triggering a BFRQ, based on at least one new candidate beam.

In FIG. 5, the timer expires, with the MAC layer not triggering a BFRQ after all. When the timer expires, the MAC layer may notify a higher layer (for example, an RRC layer) of unsuccessful BR.

In FIG. 6, in response to the inquiry about a new candidate beam, the PHY layer notifies the MAC layer that the PHY layer has a new candidate beam of {beam RS index, L1-RSRP measurement}={x, y}. The MAC layer has RACH resources specific to the new candidate beam, and hence notifies the PHY layer to perform CF-BFR using the RACH resources.

When there is no gNB response within a gNB response window, the MAC layer may repeatedly perform processing of triggering BFRQ transmission until the BFRQ transmission reaches the maximum number of times to wait for a gNB response.

In FIG. 6, the timer expires or the BFRQ transmission reaches the maximum number of times, without reception of a gNB response. In this case, the MAC layer may notify a higher layer (for example, an RRC layer) of unsuccessful BR.

In FIG. 7, as in the case of FIG. 6, the MAC layer notifies the PHY layer to perform CF-BFR using RACH resources.

When the MAC layer receives a gNB response within a gNB response window, the MAC layer stops the timer. In this case, the MAC layer may notify a higher layer (for example, an RRC layer) of successful BR.

<Only Contention-Based Resources are Supported in BFRQ Transmission>,

When the UE supports BFRQ transmission of only contention-based resources, typically, the following three cases are conceivable:

(2-1) Within a timer, there is no new candidate beam identified as criteria by using L1-RSRP;

(2-2) Within a timer, there is a new candidate beam identified as criteria by using L1-RSRP, and there are contention-based resources corresponding to the new candidate beam, but there is no response from the gNB for a BFRQ before the timer expires or before the number of times of BFRQ transmission reaches its upper limit; and (2-3) Within a timer, there is a new candidate beam identified as criteria by using L1-RSRP, there are contention-based resources corresponding to the new candidate beam, and there is a response from the gNB for a BFRQ before the timer expires or before the number of times of BFRQ transmission reaches its upper limit.

Figure 8:
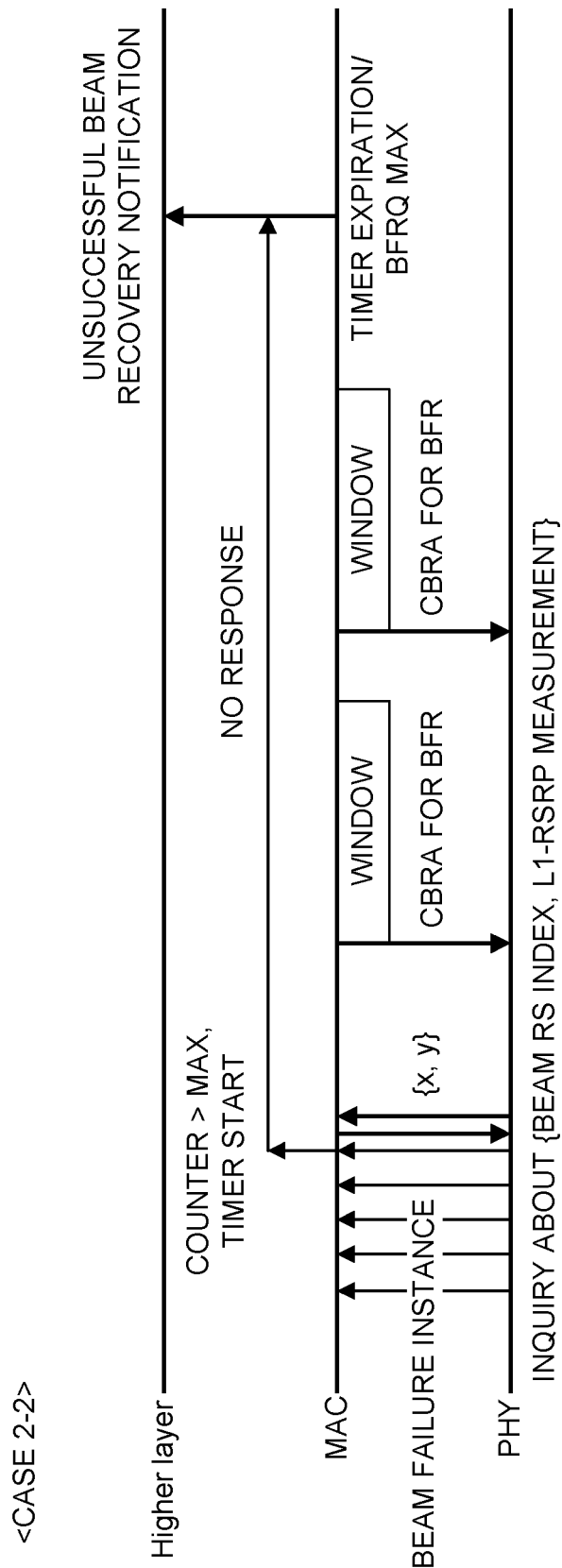
FIG. 8 is a diagram to show an example of Case (2-2)
Figure 9:
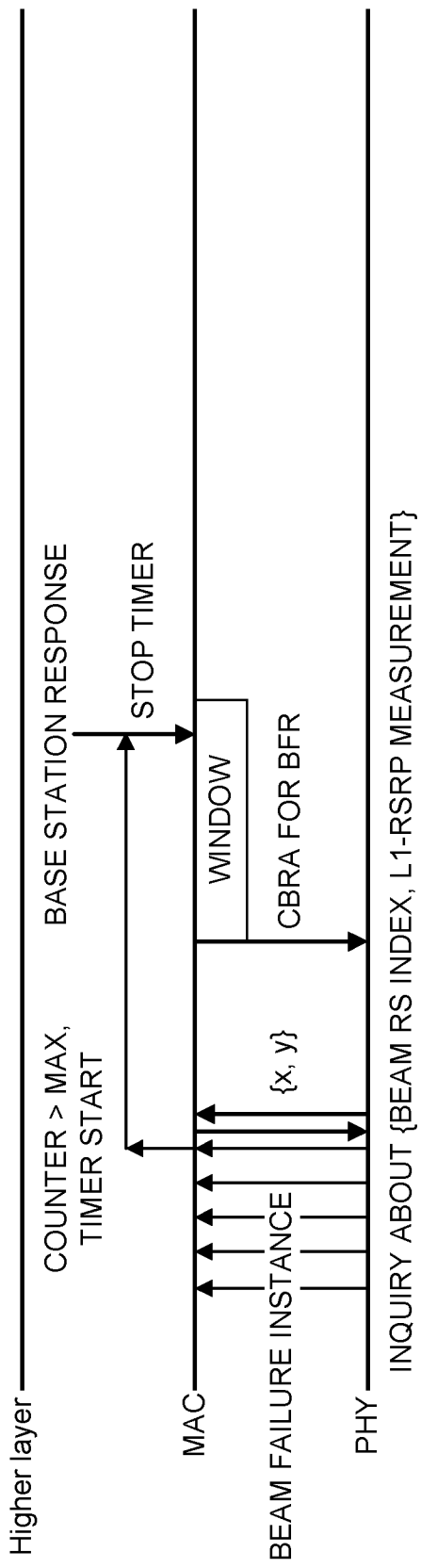
FIG. 9 is a diagram to show an example of Case (2-3)

FIG. 8 is a diagram to show an example of Case (2-2). FIG. 9 is a diagram to show an example of Case (2-3).

In FIG. 8 and the subsequent figures, the flow that the MAC layer makes an inquiry about a new candidate beam to the PHY layer is the same as the flow shown in FIGS. 4 to 7, and thus description thereof will not be repeated.

Case (2-1) is the same as Case (1-1), and thus description thereof will not be repeated.

In FIG. 8, in response to the inquiry about a new candidate beam, the PHY layer notifies the MAC layer that the PHY layer has a new candidate beam of {beam RS index, L1-RSRP measurement}={x, y}. The MAC layer has RACH resources common to (shared by) UEs corresponding to the new candidate beam, and hence notifies the PHY layer to perform CB-BFR using the RACH resources.

When there is no gNB response within a gNB response window, the MAC layer may repeatedly perform processing of triggering BFRQ transmission until the BFRQ transmission reaches the maximum number of times to wait for a gNB response.

In FIG. 8, the timer expires or the BFRQ transmission reaches the maximum number of times, without reception of a gNB response. In this case, the MAC layer may notify a higher layer (for example, an RRC layer) of unsuccessful BR.

In FIG. 9, as in the case of FIG. 8, the MAC layer notifies the PHY layer to perform CB-BFR using RACH resources.

When the MAC layer receives a gNB response within a gNB response window, the MAC layer stops the timer. In this case, the MAC layer may notify a higher layer (for example, an RRC layer) of successful BR.

<Both Contention-Based Resources and Contention-Free Resources are Supported in BFRQ Transmission>, When the UE supports BFRQ transmission of both contention-based resources and contention-free resources, typically, the following four cases are conceivable:

(3-1) Within a timer, there is no new candidate beam identified as criteria by using L1-RSRP;

(3-2) Within a timer, there is a new candidate beam identified as criteria by using L1-RSRP, and there are contention-based resources corresponding to the new candidate beam, but there are no contention-free resources corresponding to the new candidate beam;

(3-3) Within a timer, there is a new candidate beam identified as criteria by using L1-RSRP, and there are contention-free resources corresponding to the new candidate beam; and (3-4) Within a timer, there is a new candidate beam identified as criteria by using L1-RSRP, and there are contention-free resources corresponding to the new candidate beam, but there is no response from the gNB for a BFRQ before the timer expires or before the number of times of BFRQ transmission reaches its upper limit.

Figure 10:
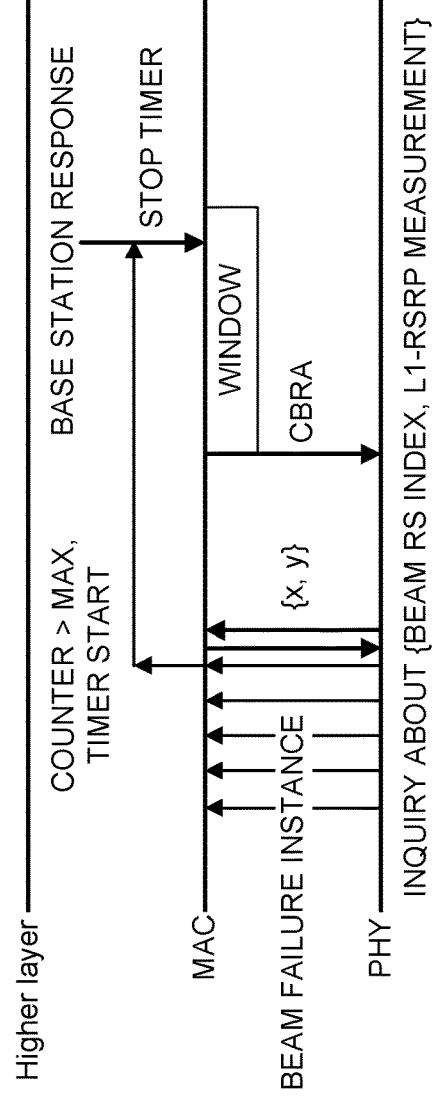
FIG. 10 is a diagram to show an example of Case (3-2) and Case (3-3)
Figure 10:
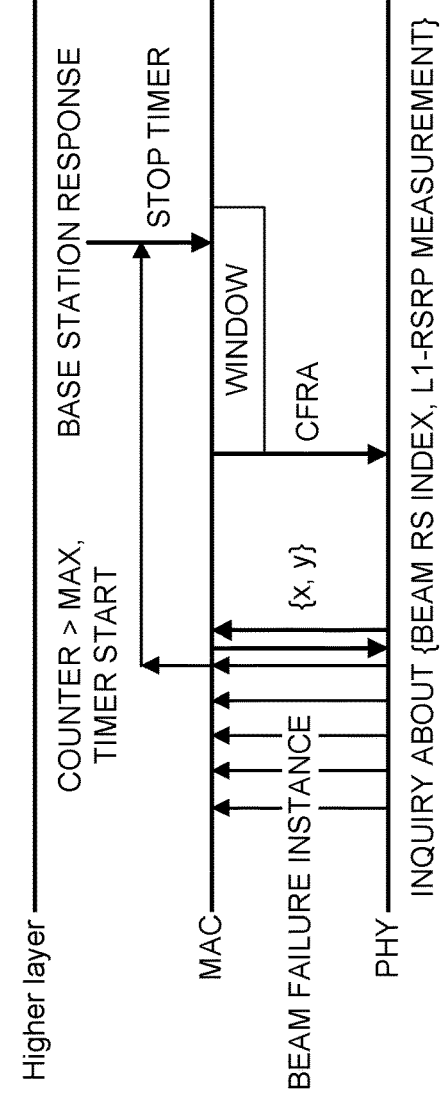
Figure 11:
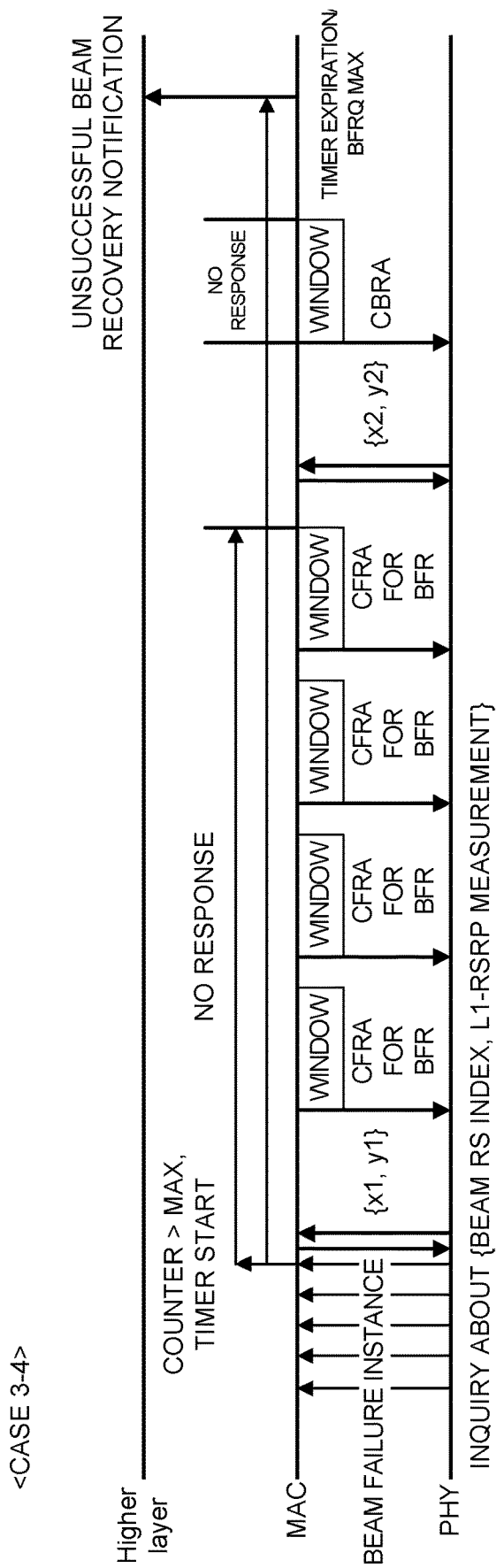
FIG. 11 is a diagram to show an example of Case (3-4)

FIG. 10 is a diagram to show an example of Case (3-2) and Case (3-3). FIG. 11 is a diagram to show an example of Case (3-4).

Case (3-1) is the same as Case (1-1), and thus description thereof will not be repeated. Note that, when the timer expires, the UE may or may not notify a higher layer of unsuccessful BR. When the UE does not notify the higher layer of unsuccessful BR, the MAC layer may trigger CB-BFR based on BFRQ transmission, and may trigger CBRA-RLF. Here, CBRA-RLF may be a contention-based RA procedure that is used when a radio link failure (RLF) causing RRC connection re-establishment occurs.

In Case (3-2) of FIG. 10, in response to the inquiry about a new candidate beam, the PHY layer notifies the MAC layer that there is a new candidate beam of {beam RS index, L1-RSRP measurement}={x, y}. The MAC layer includes CBRA resources corresponding to the new candidate beam, and may hence notify the PHY layer to perform CB-BFR using the CBRA resources. The MAC layer may trigger CBRA-RLF transmission When there is no gNB response within a gNB response window, the MAC layer may repeatedly perform processing of triggering BFRQ transmission until the BFRQ transmission reaches the maximum number of times to wait for a gNB response.

In Case (3-2) of FIG. 10, when the MAC layer receives a gNB response within a gNB response window, the MAC layer stops the timer. In this case, the MAC layer may notify a higher layer (for example, an RRC layer) of successful BR.

In Case (3-3) of FIG. 10, in response to the inquiry about a new candidate beam, the PHY layer notifies the MAC layer that there is a new candidate beam of {beam RS index, L1-RSRP measurement}={x, y}. The MAC layer includes CFRA resources corresponding to the new candidate beam, and may hence notify the PHY layer to perform CF-BFR using the CFRA resources.

When there is no gNB response within a gNB response window, the MAC layer may repeatedly perform processing of triggering BFRQ transmission until the BFRQ transmission reaches the maximum number of times to wait for a gNB response.

In Case (3-2) of FIG. 10, when a timer is defined, the MAC layer stops the timer when the MAC layer receives a gNB response within a gNB response window. In this case, the MAC layer may notify a higher layer (for example, an RRC layer) of successful BR.

In FIG. 11, in response to the inquiry about a new candidate beam, the PHY layer notifies the MAC layer that the PHY layer has a new candidate beam of {beam RS index, L1-RSRP measurement}={x1, y1}. The MAC layer determines that resources corresponding to the new candidate beam are CFRA resources, and triggers CFRA-BFR. In the case of FIG. 11, a gNB response is not received although retransmission is performed several times.

The MAC layer may make an inquiry about a new candidate beam to the PHY layer at any timing. In response to the inquiry, the PHY layer notifies the MAC layer that the PHY layer has a new candidate beam of {beam RS index, L1-RSRP measurement}={x2, y2}. The MAC layer determines that resources corresponding to the newly reported new candidate beam are CBRA resources, and triggers CBRA-BFR. In the case of FIG. 11, the timer expires, without reception of a gNB response even for a BFRQ of CBRA-BFR.

Note that, when the timer expires, the UE may or may not notify a higher layer of unsuccessful BR. When the UE does not notify the higher layer of unsuccessful BR when the timer expires, the MAC layer may trigger CBRA-BFR based on BFRQ transmission. After that, when the number of times of BFRQ transmission reaches the maximum number, the MAC layer may notify the higher layer of unsuccessful BR. When the UE does not notify the higher layer of unsuccessful BR when the timer expires, the MAC layer may trigger CBRA-RLF based on BFRQ transmission. After that, when the number of times of BFRQ transmission reaches the maximum number, the MAC layer may notify the higher layer of unsuccessful BR.

Note that a plurality of (for example, two) timers may be started for CFRA for BFR and CBRA for BFR. When either of the timers expires, the UE may notify the higher layer of an unsuccessful BR notification.

Either CFRA for BFR or CBRA for BFR may be triggered first. For example, in (3-3), CFRA-BFR is triggered first, but CBRA-BFR may be triggered first.

According to the embodiment described above, irrespective of whether CBRA-BFR or CFRA-BFR is used, a BR procedure can be performed with a BFRQ being appropriately transmitted.

(Radio Communication System)

Hereinafter, a structure of a radio communication system according to an embodiment of the present disclosure will be described. In this radio communication system, communication is carried out by using at least one or combinations of the radio communication methods illustrated in the above embodiment.

Figure 12:
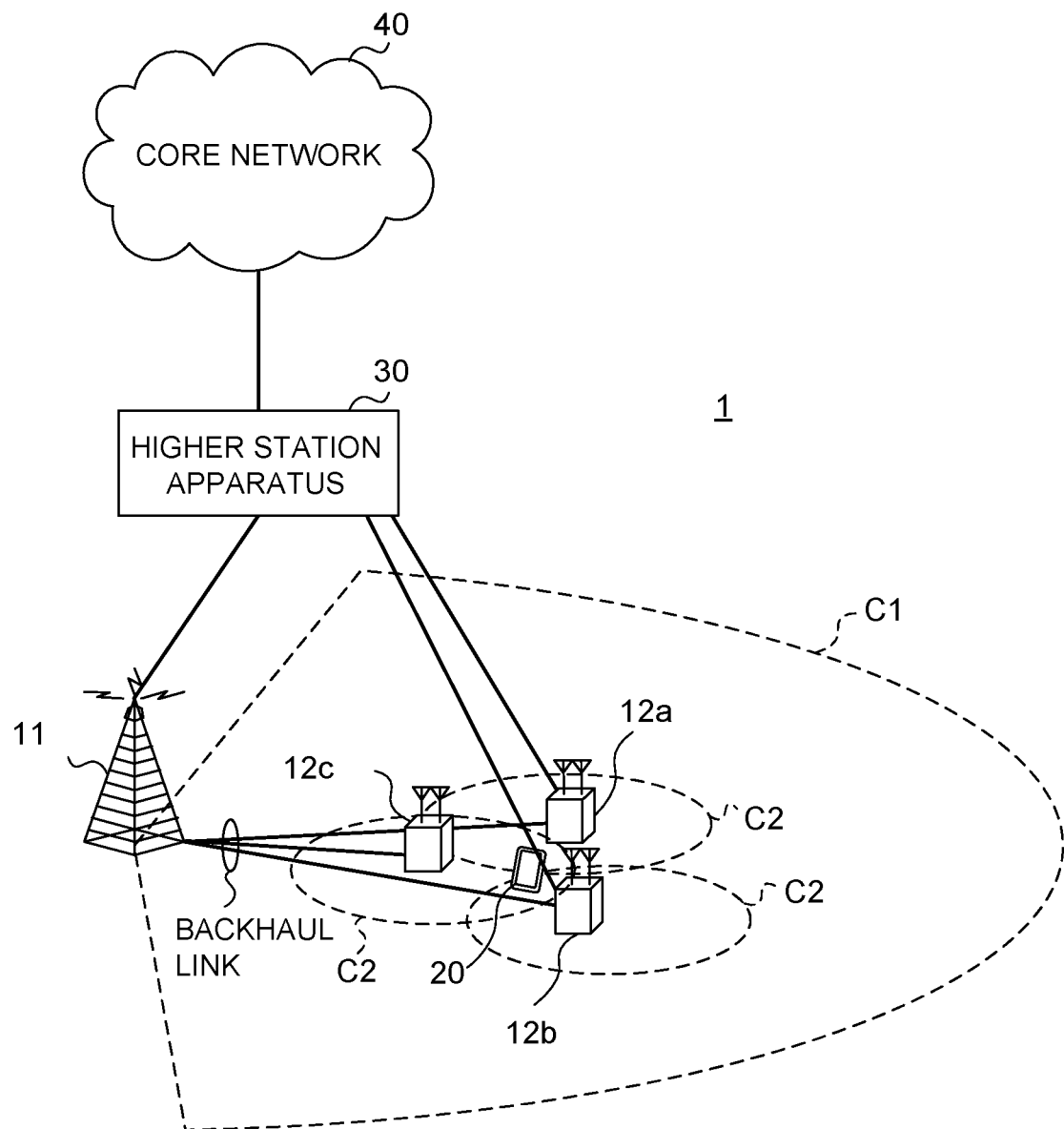
FIG. 12 is a diagram to show an example of a schematic structure of a radio communication system according to one embodiment.

FIG. 12 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channel (a PDCCH (Physical Downlink Control Channel) and/or an EPDCCH (Enhanced Physical Downlink Control Channel)), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 13:
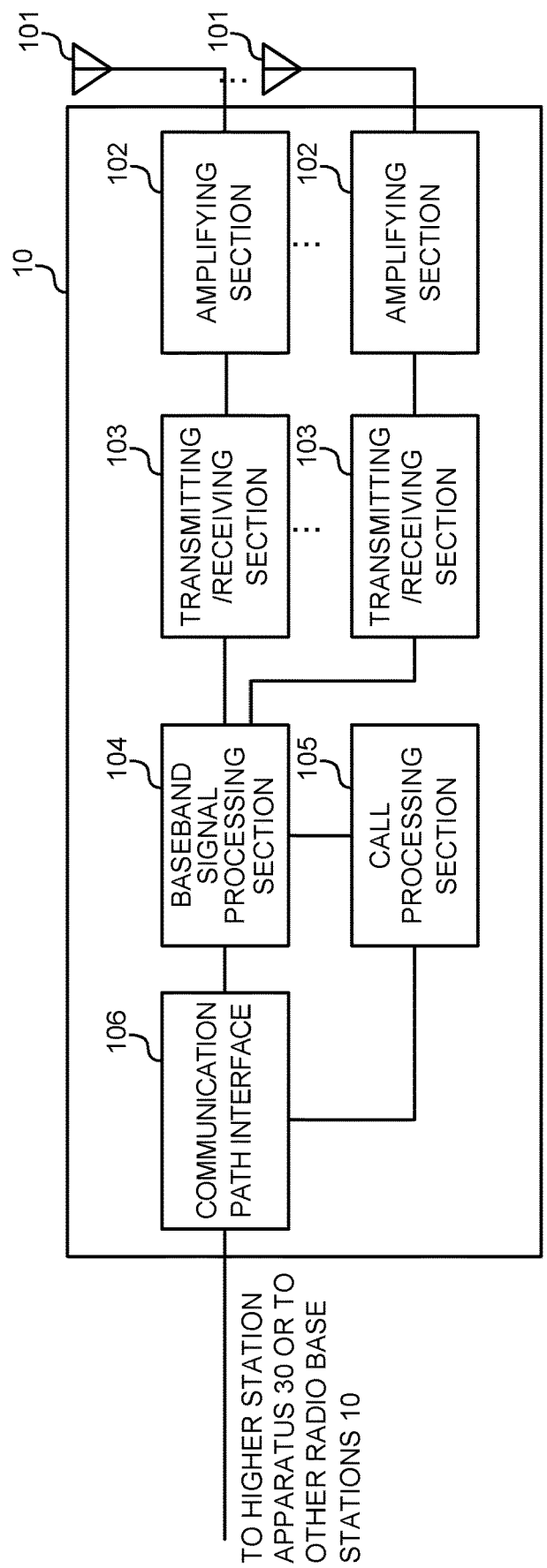
FIG. 13 is a diagram to show an example of an overall structure of a radio base station according to one embodiment.

FIG. 13 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving sections 103 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present disclosure pertains. The transmitting/receiving antennas 101 can be constituted with array antennas, for example. The transmitting/receiving sections 103 are configured to be capable of employing single BF and multi-BF.

The transmitting/receiving sections 103 may transmit signals by using transmit beams, and may receive signals by using receive beams. The transmitting/receiving sections 103 may transmit and/or receive signals by using certain beams that are determined by the control section 301.

The transmitting/receiving sections 103 may receive a variety of information described in each of the above embodiments from the user terminals 20, and/or transmit a variety of information described in each of the above embodiments to the user terminals 20.

Figure 14:
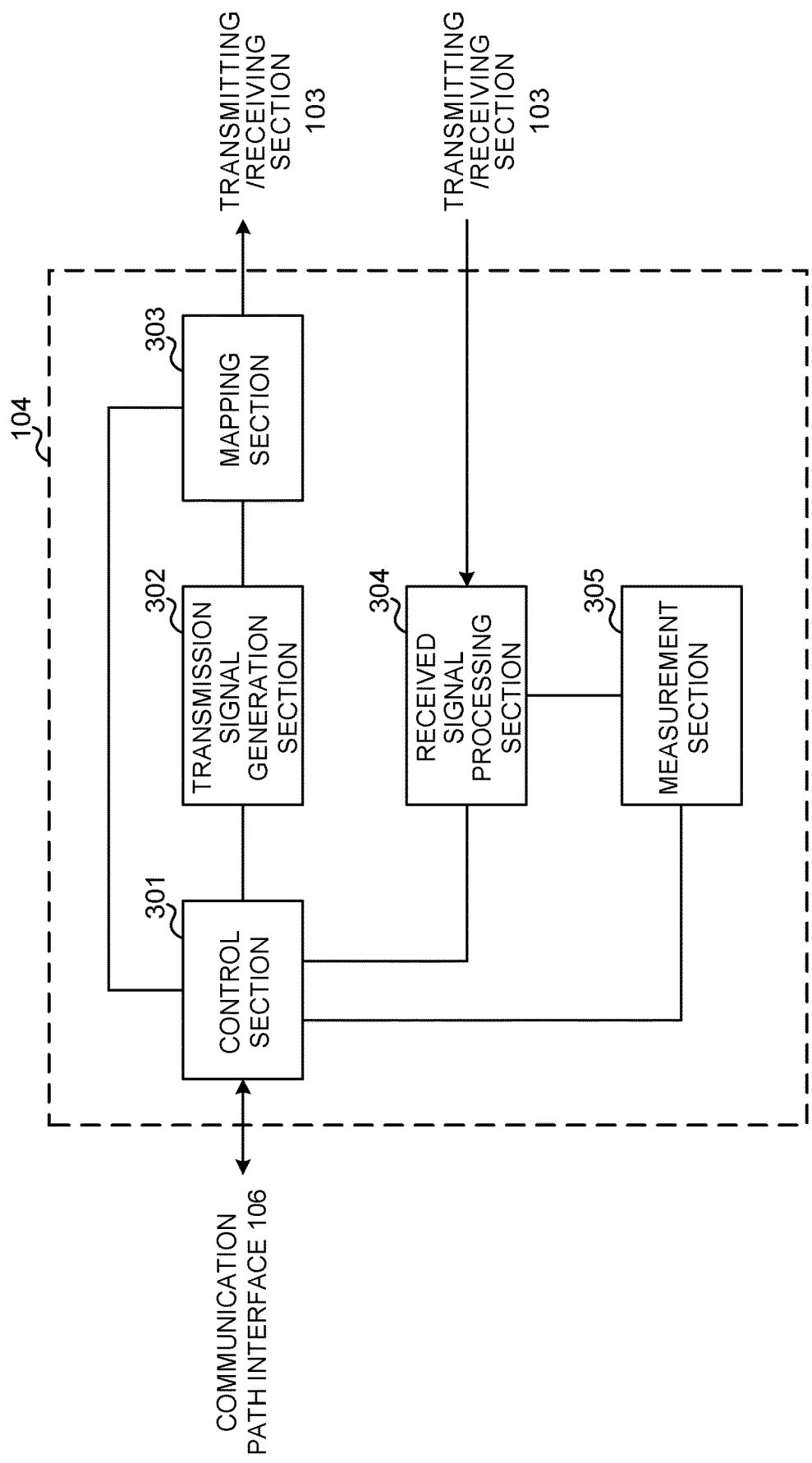
FIG. 14 is a diagram to show an example of a functional structure of the radio base station according to one embodiment.

FIG. 14 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on.

The control section 301 performs control of scheduling of a synchronization signal (for example, a PSS/SSS), a downlink reference signal (for example, a CRS, a CSI-RS, a DMRS), and so on.

The control section 301 may perform control of forming transmit beams and/or receive beams, by using digital BF (for example, precoding) performed by the baseband signal processing section 104 and/or analog BF (for example, phase rotation) performed by the transmitting/receiving sections 103.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, or the like is performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

The control section 301 may control configuration of RLF and/or BR, based on configuration information related to radio link failure (RLF) and/or beam recovery (BR).

The control section 301 may control radio link monitoring (RLM) and/or beam recovery (BR) for the user terminals 20. The control section 301 may perform control of transmitting a response signal to the user terminals 20 in response to a beam recovery request.

<User Terminal>

Figure 15:
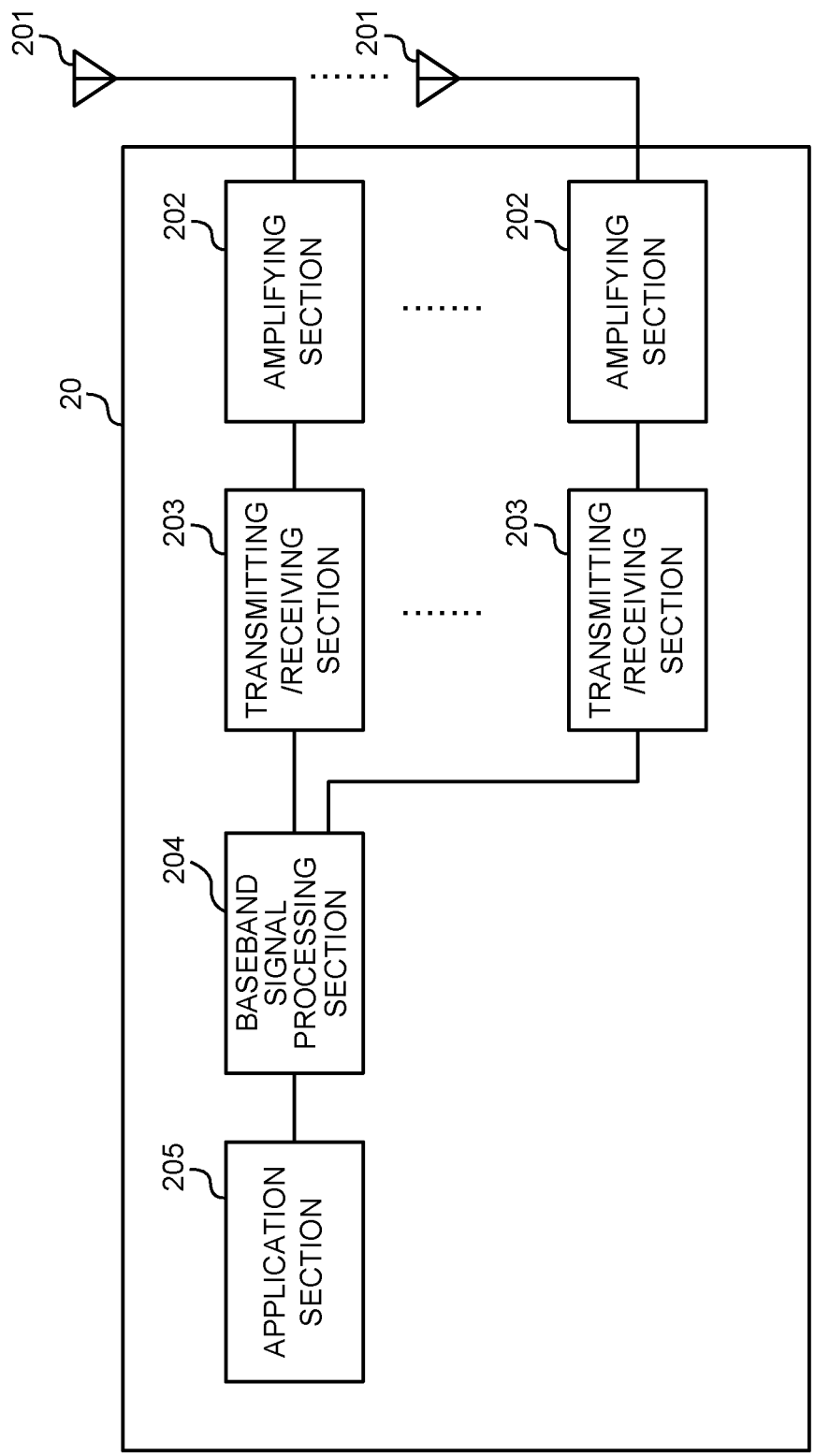
FIG. 15 is a diagram to show an example of an overall structure of a user terminal according to one embodiment.

FIG. 15 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present disclosure pertains. The transmitting/receiving antennas 201 can be constituted with array antennas, for example. The transmitting/receiving sections 203 are configured to be capable of employing single BF and multi-BF.

The transmitting/receiving sections 203 may transmit signals by using transmit beams, and may receive signals by using receive beams. The transmitting/receiving sections 203 may transmit and/or receive signals by using certain beams that are determined by the control section 401.

Figure 16:
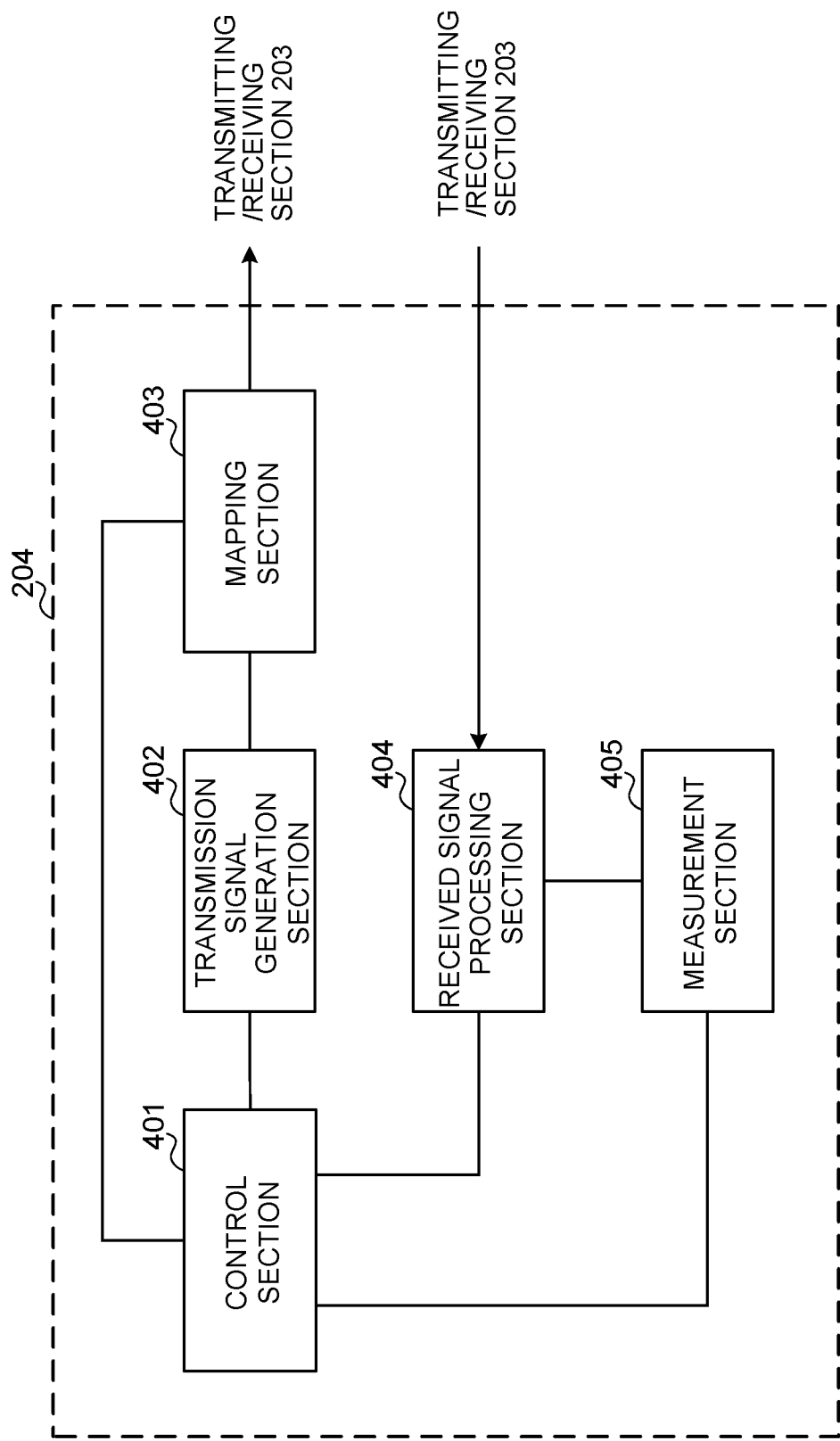
FIG. 16 is a diagram to show an example of a functional structure of the user terminal according to one embodiment.

FIG. 16 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control of forming transmit beams and/or receive beams, by using digital BF (for example, precoding) performed by the baseband signal processing section 204 and/or analog BF (for example, phase rotation) performed by the transmitting/receiving sections 203.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

The transmitting/receiving sections 203 may receive a variety of information described in each of the above embodiments from the radio base stations 10, and/or transmit a variety of information described in each of the above embodiments to the radio base stations 10. For example, the transmitting/receiving sections 203 may transmit a beam recovery request to the radio base stations 10. The transmitting/receiving sections 203 may receive information related to correspondence between an index of a reference signal for new candidate beam identification and beam recovery request (BFRQ (Beam Failure Recovery reQuest)) resources. The transmitting/receiving sections 203 may transmit the above BFRQ, by using resources determined based on a detected reference signal and the correspondence.

The control section 401 may control radio link monitoring (RLM) and/or beam recovery (BR), based on the measurement results of the measurement section 405.

The control section 401 may include a MAC layer processing section and a PHY layer processing section. Note that the MAC layer processing section and/or the PHY layer processing section may be implemented by any one or combinations of the control section 401, the transmission signal generation section 402, the mapping section 403, the received signal processing section 404, and the measurement section 405.

The MAC layer processing section performs processing of the MAC layer, and the PHY layer processing section performs processing of the PHY layer. For example, downlink user data, broadcast information, and so on input from the PHY layer processing section may be processed by the MAC layer processing section, and then be output to a higher layer processing section that performs processing of the RLC layer, the PDCP layer, and so on.

The PHY layer processing section may detect a beam failure. The PHY layer processing section may notify the MAC layer processing section of information related to a detected beam failure.

The MAC layer processing section may trigger transmission of a beam recovery request of the PHY layer processing section. For example, the MAC layer processing section may trigger transmission of a beam recovery request, based on information related to a beam failure notified from the PHY layer processing section.

The control section 401 may perform control of transmitting the above BFRQ, by using resources (for example, CFRA resources and CBRA resources) determined based on information related to correspondence between an index of a reference signal for new candidate beam identification and beam recovery request (BFRQ (Beam Failure Recovery reQuest)) resources, and a detected reference signal (an SS, a CSI-RS, and so on).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 17:
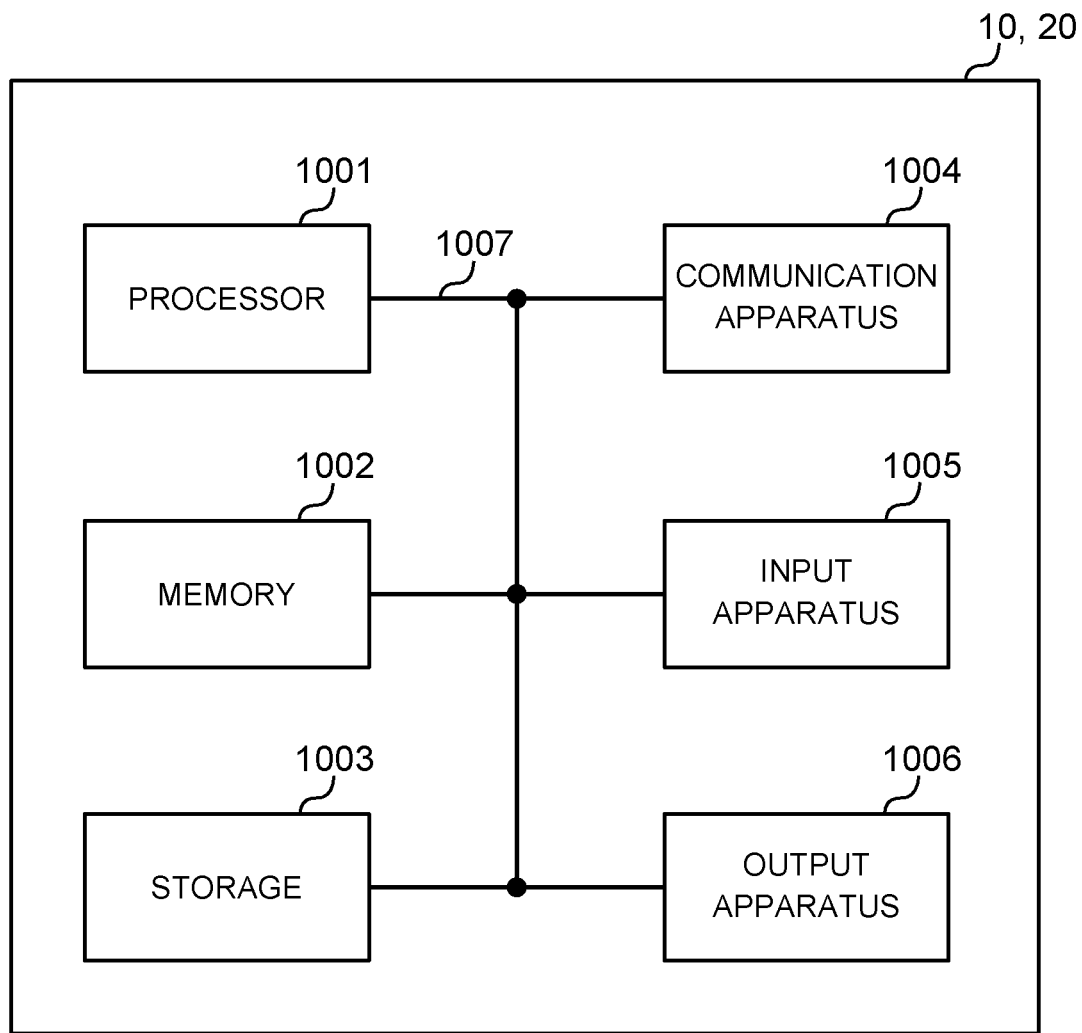
FIG. 17 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 17 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as a radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

(Supplementary Note)

Supplementary notes of the present disclosure are added below.

<Clarification>

CBRA-BFR (contention-based random access-beam failure recovery) and CBRA-RLF (contention-based random access-radio link failure)
 CBRA-BFR: Contention-based PRACH (Physical Random Access Channel) used only for beam recovery that causes reconfiguration/activation of a transmission configuration indicator (TCI) and/or reconfiguration of beam recovery parameters (for example, a new candidate beam reference signal (RS) list)
 CBRA-RLF: Contention-based PRACH used for a radio link failure that causes RRC (Radio Resource Control) connection re-establishment
 From the point of view of the PHY (physical layer), the four-step procedure is similar to CBRA-BFR and CBRA-RLF.
 From the point of view of the higher layer, the procedure is different from CBRA-BFR and CBRA-RLF.
  Msg. 3 includes an RRC connection re-establishment request in CBRA-RLF.
  Msg. 3 may not include an RRC connection re-establishment request in CBRA-BFR.

CBRA and CFRA-BFR
 Contention-based PRACH resources are allocated for a dedicated UE.
 Contention-free PRACH resources for BFR are shared by a plurality of UEs.

<BFRQ (Beam Failure Recovery Request) Transmission>
  Resources for BFRQ transmission
    Dedicated/pre-configured/contention-free resources
      Contention-free PRACH
      PUSCH (Physical Uplink Control Channel)
        Reason: Granularity smaller than that of a PRACH, and reduction in UL (uplink) overheads
      UL grant free (configured grant) PUSCH (Physical Uplink Shared Channel)
        Reason: Simple and prompt
    Contention-based resources
      Contention-based PRACH
      The difference between CBRA and CFRA is whether or not resources are shared by UEs.
        In CFRA, PRACH resources can be allocated for each beam of each UE.
        In CBRA, PRACH resources can be allocated for each beam of all UEs.
  BFRQ transmission procedure
    Scheme 1: Only contention-free resources for BFRQ transmission are supported
      Condition for BFRQ: Detection of a new candidate beam associated with a dedicated PRACH configured for a specific UE
    Scheme 2: Only contention-based resources for BFRQ transmission are supported
      Condition for BFRQ: Detection of a new candidate beam associated with a dedicated PRACH configured for all UEs
        An SS (Synchronization Signal) only for new candidate beam identification
    Scheme 3: Configuration of both contention-based resources and contention-free resources for BFRQ transmission is supported
      Condition for BFRQ: Detection of a new candidate beam
    Note that all the above conditions fall within a beam failure recovery system (for example, a beam recovery timer has not yet expired, and a BFRQ transmission number is equal to or less than a maximum number).
<CFRA-Based BFR>
  PRACH resources are allocated for each beam of each UE (UE 1, UE 2, UE 3, and UE 4).
  Dedicated PRACH resources for each UE
  The gNB (gNodeB) can detect which entity failed to receive a DL (downlink) beam, and which beam is a new candidate.
<CBRA-Based BFR (CFRA-Based BFR)>
  PRACH resources are allocated for each beam of all UEs (UEs 1/2/3/4).
  PRACH resources shared by UEs
  The gNB can detect which beam is a new candidate of which entity. The gNB can know which entity failed to receive a DL beam, based on contention resolution.

<BFRQ Transmission Procedure-Scheme 1>
  Scheme 1: Only contention-free resources for BFRQ transmission are supported
    Case 1-1
      Beam failure instance
      An inquiry about {beam RS index, L1 (Layer 1)-RSRP (Reference Signal Received Power) measurement} from MAC to PHY
      None
      A timer starts when a counter reaches a maximum value
      Beam recovery unsuccessful indication to a higher layer when the timer expires
    Case 1-2
      Beam failure instance
      An inquiry about {beam RS index, L1-RSRP measurement} from MAC to PHY
      {x1, y1}
      {x2, y2}
      {x2, y2}
      A timer starts when a counter reaches a maximum value
      No dedicated RACH resources for a new candidate beam
      Beam recovery unsuccessful indication to a higher layer when the timer expires
    Case 1-3
      Beam failure instance
      An inquiry about {beam RS index, L1-RSRP measurement} from MAC to PHY
      {x, y}
      A timer starts when a counter reaches a maximum value
      Dedicated RACH resources for a new candidate beam
      CFRA for BFR from MAC to PHY
      No response within a window
      Beam recovery unsuccessful indication to a higher layer when the timer expires/when BFRQ reaches a maximum value
    Case 1-4
      Beam failure instance
      An inquiry about {beam RS index, L1-RSRP measurement} from MAC to PHY
      {x, y}
      A timer starts when a counter reaches a maximum value
      Dedicated RACH resources for a new candidate beam
      CFRA for BFR from MAC to PHY
      The timer is stopped when there is a gNB response within a window
<BFRQ Transmission Procedure-Scheme 2>
  Scheme 2: Only contention-based resources for BFRQ transmission are supported
    Case 2-1
      Beam failure instance
      An inquiry about {beam RS index, L1-RSRP measurement} from MAC to PHY
      None
      A timer starts when a counter reaches a maximum value
      Beam recovery unsuccessful indication to a higher layer when the timer expires
    Case 2-2
      Beam failure instance
      An inquiry about {beam RS index, L1-RSRP measurement} from MAC to PHY
      {x, y}
      A timer starts when a counter reaches a maximum value
      No dedicated RACH resources for a new candidate beam
      CBRA for BFR from MAC to PHY
      No response within a window
      Beam recovery unsuccessful indication to a higher layer when the timer expires/when BFRQ reaches a maximum value Case 2-3
  Beam failure instance
  An inquiry about {beam RS index, L1-RSRP measurement} from MAC to PHY
    {x, y}
  A timer starts when a counter reaches a maximum value
  No dedicated RACH resources for a new candidate beam
  CBRA for BFR from MAC to PHY
  The timer is stopped when there is a gNB response within a window <BFRQ Transmission Procedure-Scheme 3>
Scheme 3: Configuration of both contention-based resources and contention-free resources for BFRQ transmission is supported
  Case 3-1
    Beam failure instance
    An inquiry about {beam RS index, L1-RSRP measurement} from MAC to PHY
      None
    A timer starts when a counter reaches a maximum value
    Beam recovery unsuccessful indication to a higher layer when the timer expires
    P1: When there is no new candidate beam identified by using L1-RSRP as determination criteria within a timer, one of the following options 1, 2, and 3 may be performed.
      Option 1: The UE transmits beam recovery unsuccessful indication to a higher layer.
      Option 2: The UE does not transmit beam recovery unsuccessful indication to a higher layer, and MAC triggers CBRA-BFR-based beam recovery request transmission.
      Option 3: The UE does not transmit beam recovery unsuccessful indication to a higher layer, and MAC triggers CBRA-RLF transmission.
  Case 3-2
    Beam failure instance
    An inquiry about {beam RS index, L1-RSRP measurement} from MAC to PHY
      {x, y}
    A timer starts when a counter reaches a maximum value
    No dedicated RACH resources for a new candidate beam
    CBRA from MAC to PHY
    The timer is stopped when there is a gNB response within a window
    P2: When there is a dedicated new candidate beam identified by using L1-RSRP as determination criteria within a timer, but CFRA resources are not configured for a UE, one of the following options 1 and 2 may be performed.
      Option 1: The UE triggers CBRA-BFR-based beam recovery request transmission.
      Option 2: The UE triggers CBRA-RLF transmission.
  Case 3-3
    Beam failure instance
    An inquiry about {beam RS index, L1-RSRP measurement} from MAC to PHY
      {x, y}
    A timer starts when a counter reaches a maximum value
    Dedicated RACH resources for a new candidate beam
    CFRA from MAC to PHY
    The timer is stopped when there is a gNB response within a window
    P3: When there is a dedicated new candidate beam identified by using L1-RSRP as determination criteria within a timer, and CFRA resources are configured for a UE, the following option 1 may be performed.
      Option 1: The UE triggers CBRA-BFR-based beam recovery request transmission. Then, when a timer is defined and a gNB response is received, the UE stops the timer.
  Case 3-4
    Beam failure instance
    An inquiry about {beam RS index, L1-RSRP measurement} from MAC to PHY
      {x1, y1}
    A timer starts when a counter reaches a maximum value
    Dedicated RACH resources for a new candidate beam
    CFRA for BFR from MAC to PHY
    No response within a window
    The timer expires
    {x2, y2}
    Another beam
    CBRA from MAC to PHY
    No response within a window
    Beam recovery unsuccessful indication to a higher layer when BFRQ reaches a maximum value
    P4: When there is a dedicated new candidate beam identified by using L1-RSRP as determination criteria within a timer, CFRA resources are configured for a UE, and a response from the gNB is not received within the timer, one of the following options 1, 2, and 3 may be performed.
      Option 1: The UE transmits beam recovery unsuccessful indication to a higher layer.
      Option 2: When the timer expires, the UE does not transmit beam recovery unsuccessful indication to a higher layer, and MAC triggers CBRA-BFR-based beam recovery request transmission. When BFRQ reaches a maximum value, the UE transmits beam recovery unsuccessful indication to a higher layer.
      Option 3: When the timer expires, the UE does not transmit beam recovery unsuccessful indication to a higher layer, and MAC triggers CBRA-RLF transmission. When BFRQ reaches a maximum value, the UE transmits beam recovery unsuccessful indication to a higher layer.

Note that a plurality of pieces of new beam information {beam RS index, L1-RSRP measurement} may be provided within one report. For example, {x1, y1} and {x2, y2} exist within the same report, and MAC makes a selection as to which beam is used for BFRQ transmission. L1-RSRP may be other metrics (for example, a BLER (Block Error Rate)).

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2018-090962, filed on Apr. 18, 2018, the contents of which are incorporated by reference herein in its entirety.

What is claimed is:

1. A terminal comprising:
   a processor that starts a timer based on a beam failure instance counter;
   a receiver that receives a reference signal for identifying a candidate beam; and
   a transmitter that:
      if the reference signal has layer 1 reference signal received power (L1-RSRP) exceeding a threshold value before the timer expires, and if there is at least one of contention-free random access (CFRA) resources corresponding to the reference signal, transmits a random access preamble using the at least one of CFRA resources; and
      if the timer expires, transmits the random access preamble using a contention-based random access (CBRA) resource.

2. The terminal according to claim 1, wherein, if the reference signal does not have L1-RSRP exceeding the threshold value, or if there is no CFRA resource corresponding to the reference signal, the transmitter uses the CBRA resource to transmit the random access preamble.

3. A radio communication method for a terminal, the radio communication method comprising:
   starting a timer based on a beam failure instance counter;
   receiving a reference signal for identifying a candidate beam;
   in response to the reference signal having layer 1 reference signal received power (L1-RSRP) exceeding a threshold value before the timer expires, and in response to at least one of contention-free random access (CFRA) resources corresponding to the reference signal being available, transmitting a random access preamble using the at least one of CFRA resources; and
   in response to the timer expiring, transmitting the random access preamble using a contention-based random access (CBRA) resource.

4. A base station in communication with a terminal, the base station comprising:
   a transmitter that transmits a reference signal for identifying a candidate beam to the terminal; and
   a receiver that receives:
      if the reference signal has layer 1 reference signal received power (L1-RSRP) exceeding a threshold value before a timer which is started by the terminal based on a beam failure instance counter expires, and if there is at least one of contention-free random access (CFRA) resources corresponding to the reference signal, a random access preamble transmitted using the at least one of CFRA resources; and
      if the timer expires, the random access preamble transmitted using a contention-based random access (CBRA) resource.

5. A system comprising:
   a terminal that comprises:
      a processor that starts a timer based on a beam failure instance counter;
      a receiver that receives a reference signal for identifying a candidate beam; and
      a transmitter that:
         if the reference signal has layer 1 reference signal received power (L1-RSRP) exceeding a threshold value before the timer expires, and if there is at least one of contention-free random access (CFRA) resources corresponding to the reference signal, transmits a random access preamble using the at least one of CFRA resources; and
         if the timer expires, transmits the random access preamble using a contention-based random access (CBRA) resource; and
   a base station that comprises:
      a transmitter that transmits the reference signal for identifying the candidate beam; and
      a receiver that receives the random access preamble.

* * * * *